US012598034B2

(12) United States Patent　　　(10) Patent No.:　US 12,598,034 B2
Deng　　　　　　　　　　　　　　(45) Date of Patent:　　　Apr. 7, 2026

(54) METHODS, USER EQUIPMENT AND NON-TRANSITORY COMPUTER-READABLE MEDIA FOR AUTONOMOUS RESOURCE SELECTION

(71) Applicant: Samsung Electronics Co., Ltd., Suwon-si (KR)

(72) Inventor: Jie Deng, Suzhou Industrial Park (CN)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 593 days.

(21) Appl. No.: 17/946,463

(22) Filed: Sep. 16, 2022

(65) Prior Publication Data

US 2023/0388065 A1　　　Nov. 30, 2023

(30) Foreign Application Priority Data

May 31, 2022　(CN) ......................... 202210608479.1

(51) Int. Cl.
　　*H04W 76/14*　　(2018.01)
　　*H04L 5/00*　　(2006.01)
　　*H04W 72/51*　　(2023.01)
　　*H04W 72/543*　　(2023.01)
(52) U.S. Cl.
　　CPC ........... *H04L 5/0007* (2013.01); *H04W 72/51* (2023.01); *H04W 72/543* (2023.01); *H04W 76/14* (2018.02)
(58) Field of Classification Search
　　CPC .. H04L 5/0007; H04W 72/51; H04W 72/543; H04W 76/14; H04W 72/12; H04W 72/512
　　See application file for complete search history.

(56) References Cited

U.S. PATENT DOCUMENTS

| | | | |
|---|---|---|---|
| 11,044,748 B2 | 6/2021 | Cao et al. | |
| 12,108,337 B2 * | 10/2024 | Yang ................ | H04W 52/0235 |
| 2019/0053251 A1 | 2/2019 | Loehr et al. | |
| 2020/0053675 A1 | 2/2020 | Khoryaev et al. | |
| 2021/0120528 A1 | 4/2021 | Peng et al. | |

(Continued)

FOREIGN PATENT DOCUMENTS

CN　　　　　107371258 A　　　11/2017

OTHER PUBLICATIONS

Chinese Office Action, dated Nov. 29, 2024, issued in Chinese Patent Application No. 202210608479.1.

*Primary Examiner* — Ayman A Abaza
*Assistant Examiner* — Benjamin T. Ranew
(74) *Attorney, Agent, or Firm* — Harness, Dickey & Pierce, P.L.C.

(57)　　　　　　　ABSTRACT

A method for autonomous resource selection by a user equipment (UE). The method includes obtaining a sidelink resource set, a number of current UEs and a first user identifier (ID) from a network, the number of current UEs corresponding to UEs currently participating in sidelink transmission in a serving cell, assigning a plurality of sequence numbers to a plurality of resource units among the sidelink resource set, selecting a subset of the plurality of resource units as sidelink resources of the UE based on the number of current UEs and the first user ID, the subset of the plurality of resource units having particular sequence numbers from among the plurality of sequence numbers, and transmitting a communication signal using the sidelink resources of the UE.

20 Claims, 7 Drawing Sheets

(56) References Cited

U.S. PATENT DOCUMENTS

| 2021/0127364 A1 | 4/2021 | Panteleev et al. |
| 2021/0144681 A1 | 5/2021 | Gulati et al. |
| 2021/0168814 A1 | 6/2021 | Chen et al. |
| 2021/0204283 A1 | 7/2021 | Zhao et al. |
| 2021/0345300 A1 | 11/2021 | Selvanesan et al. |
| 2022/0070876 A1 | 3/2022 | Bangolae et al. |
| 2022/0167340 A1* | 5/2022 | Ji ......................... H04W 72/20 |

* cited by examiner

Frequency
Domain
(Sub-channels)

Time Domain (Slots)

METHODS, USER EQUIPMENT AND NON-TRANSITORY COMPUTER-READABLE MEDIA FOR AUTONOMOUS RESOURCE SELECTION

CROSS-REFERENCE TO RELATED APPLICATION

This application is based on and claims priority under 35 U.S.C. § 119 to Chinese Patent Application No. 202210608479.1, filed on May 31, 2022, in the Chinese Intellectual Property Office, the disclosure of which is incorporated by reference herein in its entirety.

TECHNICAL FIELD

Some example embodiments relate to a method, user equipment (UE) and non-transitory computer-readable medium for autonomous resource selection by a UE, and more particularly, relate to a method, UE and/or non-transitory computer-readable medium for autonomous selection, by a UE, of sidelink transmission resources in NR (New Radio) V2X (vehicle to everything, Internet of Vehicles) mode 2.

BACKGROUND

Sidelink communication is a communication mode in which UEs or user terminals communicate directly with each other through a PC5 interface. According to the $3^{rd}$ Generation Partnership Project (3GPP) protocol, there are two modes for resource selection of NR V2X sidelink data transmission: mode 1 is a mode in which the allocation of sidelink transmission resources is performed by a network, and mode 2 is a mode in which the UE selects sidelink transmission resources autonomously based on information configured or pre-configuration by the network.

In mode 2, it is an unplanned behavior for user equipment to autonomously select sidelink transmission resources (e.g., unscheduled access of the sidelink transmission resources). As a number of UEs in one cell is increases, the probability of resource collision is also increases. In addition, the UEs continuously perform processes such as resource sensing and RSRP (Reference Signal Receiving Power) measurement or the like, which results in excessive power consumption and occupation of processing resources.

Therefore, an improved technology for UEs to select resources autonomously is being sought.

SUMMARY

This Summary is provided to introduce a selection of concepts in a simplified form that are further described below in the Detailed Description. This Summary is not intended to identify key features and/or essential features of the claimed subject matter, nor is it intended to be used as an aid in determining the scope of the claimed subject matter.

According to some example embodiments, a method for autonomous resource selection by a user equipment (UE), the method may include obtaining a sidelink resource set, a number of current UEs and a first user identifier (ID) from a network, the number of current UEs corresponding to UEs currently participating in sidelink transmission in a serving cell, assigning a plurality of sequence numbers to a plurality of resource units among the sidelink resource set, selecting a subset of the plurality of resource units as sidelink resources of the UE based on the number of current UEs and the first user ID, the subset of the plurality of resource units having particular sequence numbers from among the plurality of sequence numbers, and transmitting a communication signal using the sidelink resources of the UE.

The method may include dividing the sidelink resource set according to both a minimum resource allocation granularity in a time domain and a minimum resource allocation granularity in a frequency domain to obtain the plurality of resource units, wherein the assigning the plurality of sequence numbers comprises assigning the plurality of sequence numbers to the plurality of resource units sequentially in ascending order with respect to the time domain prior to the frequency domain.

The minimum resource allocation granularity in the time domain may include a slot or an orthogonal frequency division multiplexing symbol, and the minimum resource allocation granularity in the frequency domain may include one of a sub-channel, a resource block, a physical resource block or a resource block group.

The sidelink resources of the UE may include an initial transmission resource unit and retransmission resource units, the retransmission resource units including first to Nth retransmission resource units, N being a positive integer, and the selecting the subset of the plurality of resource units may include determining the particular sequence numbers from among the plurality sequence numbers, the particular sequence numbers including a first sequence number and second sequence numbers, the first sequence number being determined by performing a modulo operation based on the first user ID and a number of the plurality of resource units, and a particular second sequence number among the second sequence numbers being determined by adding the first sequence number to a product of the number of current UEs and N, and selecting the initial transmission resource unit based on the first sequence number and the retransmission resource units based on the second sequence numbers, the particular second sequence number corresponding to the Nth retransmission resource unit.

The method may include repeating the obtaining the sidelink resource set based on a time period or a change in the number of current UEs.

The time period may be 32 slots.

The first user ID may be allocated to the UE by the network, the first user ID may be an integer between 0 and 255, and the first user ID may be unique within the serving cell. The method may include releasing, by the UE, the first user ID when the UE exits the serving cell, and re-allocating, by the network, the first user ID to another UE entering the serving cell based on the first user ID having a lowest value among available user IDs.

All UEs in the serving cell may perform the assigning at the same time and according to the same minimum resource allocation granularity a such that the plurality of sequence numbers assigned to the plurality of resource units are the same for all the UEs.

According to some example embodiments, a UE may include processing circuitry configured to obtain a sidelink resource set, a number of current UEs and a first user identifier (ID) from a network, the number of current UEs corresponding to UEs currently participating in sidelink transmission in a serving cell, assign a plurality of sequence numbers to a plurality of resource units among the sidelink resource set, select a subset of the plurality of resource units as sidelink resources of the UE based on the number of current UEs and the first user ID, the subset of the plurality of resource units having particular sequence numbers from among the plurality of sequence numbers, and transmit a communication signal using the sidelink resources of the UE.

The processing circuitry may be configured to divide the sidelink resource set according to both a minimum resource allocation granularity in a time domain and a minimum resource allocation granularity in a frequency domain to obtain the plurality of resource units, assign the plurality of sequence numbers to the plurality of resource units sequentially in ascending order with respect to the time domain prior to the frequency domain.

The minimum resource allocation granularity in the time domain may include a slot or an orthogonal frequency division multiplexing symbol, and the minimum resource allocation granularity in the frequency domain may include one of a sub-channel, a resource block, a physical resource block or a resource block group.

The sidelink resources of the UE may include an initial transmission resource unit and retransmission resource units, the retransmission resource units including first to Nth retransmission resource units, N being a positive integer, and the processing circuitry may be configured to select the subset of the plurality of resource units by determining the particular sequence numbers from among the plurality sequence numbers, the particular sequence numbers including a first sequence number and second sequence numbers, the first sequence number being determined by performing a modulo operation based on the first user ID and a number of the plurality of resource units, and a particular second sequence number among the second sequence numbers being determined by adding the first sequence number to a product of the number of current UEs and N, and selecting the initial transmission resource unit based on the first sequence number and the retransmission resource units based on the second sequence numbers, the particular second sequence number corresponding to the Nth retransmission resource unit.

The processing circuitry may be configured to re-obtain the sidelink resource set from the network based on a time period or a change in the number of current UEs.

The time period may be 32 slots.

The first user ID may be allocated to the UE by the network, the first user ID may be an integer between 0 and 255, and the first user ID may be unique within the serving cell. The processing circuitry may be configured to release the first user ID when the UE exits the serving cell, and the network may be configured to re-allocate the first user ID to another UE entering the serving cell based on the first user ID having a lowest value among available user IDs All UEs in the serving cell may perform the assignment of the plurality of sequence numbers at the same time and according to the same minimum resource allocation granularity a such that the plurality of sequence numbers assigned to the plurality of resource units are the same for all the UEs.

According to some example embodiments, a non-transitory computer-readable storage medium stores instructions that, when executed by at least one processor, cause the at least one processor to obtain a sidelink resource set, a number of current UEs and a first user identifier (ID) from a network, the number of current UEs corresponding to UEs currently participating in sidelink transmission in a serving cell, assign a plurality of sequence numbers to a plurality of resource units among the sidelink resource set, select a subset of the plurality of resource units as sidelink resources of the UE based on the number of current UEs and the first user ID, the subset of the plurality of resource units having particular sequence numbers from among the plurality of sequence numbers, and transmit a communication signal using the sidelink resources of the UE.

The method for a user equipment to select resources autonomously and the communication equipment according to some example embodiments of the inventive concepts may plan (e.g., schedule) the sidelink resources reasonably based on the user identifier and the number of UEs currently participating in sidelink transmission in the current serving cell, thereby the probability of resource collision, the time (e.g., amount of time) for determining candidate resources, the probability of the re-evaluation process and the pre-emption process, and the power consumption of the UE may be reduced.

Other aspects and/or advantages of the inventive concepts will be partially described in the following description, and part will be clear through the description and/or may be learn through the practice of some example embodiments.

BRIEF DESCRIPTION OF THE DRAWINGS

The above and other aspects, features and advantages of the present disclosure will become clearer through the following detailed description together with the accompanying drawings in which.

DETAILED DESCRIPTION

Figure 1:
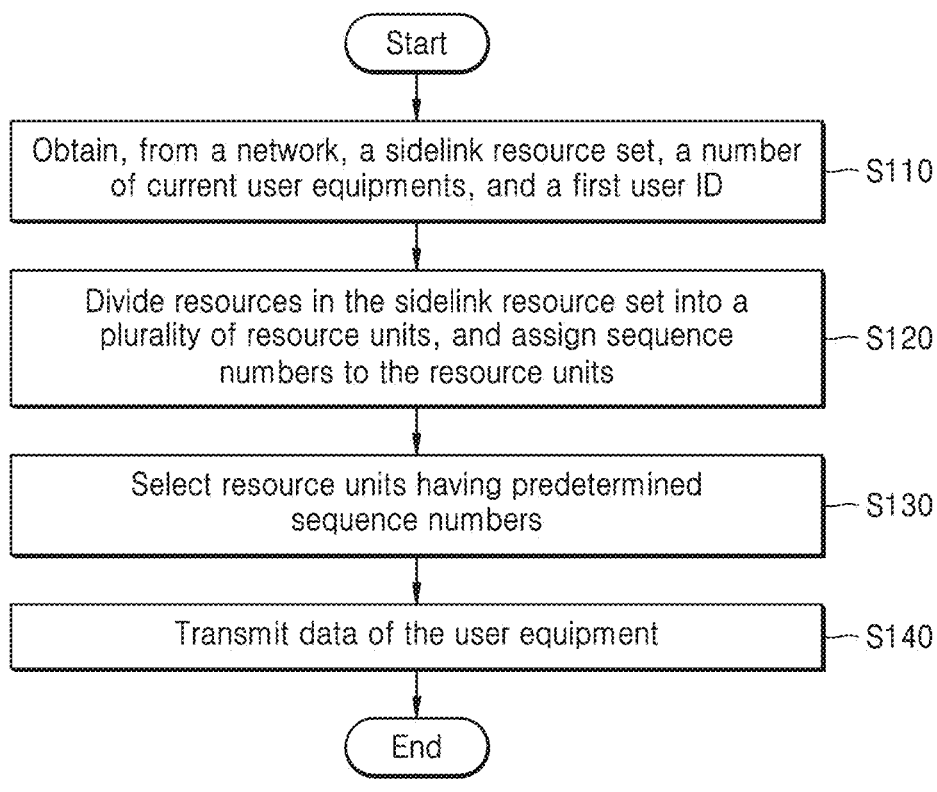
FIG. 1 is a flowchart illustrating a method for a UE to select resources autonomously according to some example embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application unless the context clearly indicates otherwise. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following structural or functional descriptions of examples disclosed herein are merely intended for the purpose of describing the examples and the examples may be implemented in various forms. The examples are not meant to be limiting, but it is intended that various modifications, equivalents, and alternatives are also covered within the scope of the claims.

Although terms of "first" or "second" may be used to explain various components, the components are not limited to the terms. These terms are used to distinguish one component from another component. For example, a "first" component may be referred to as a "second" component, or similarly, and the "second" component may be referred to as the "first" component.

It will be understood that when a component is referred to as being "connected to" another component, the component may be directly connected, or coupled, to the other component or intervening components may be present.

As used herein, the singular forms "a", "an", and "the" are intended to include the plural forms as well, unless the context clearly indicates otherwise. It should be further understood that the terms "comprises" and/or "comprising", when used in this specification, specify the presence of stated features, integers, operations, elements, components or a combination thereof, but do not preclude the presence or addition of one or more other features, integers, operations, elements, components, and/or groups thereof.

Unless otherwise defined, all terms including technical or scientific terms used herein have the same meaning as, or a similar meaning to, that commonly understood by one of ordinary skill in the art to which examples belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, examples will be described in detail with reference to the accompanying drawings. Regarding the reference numerals assigned to the elements in the drawings, it should be noted that the same elements (or similar elements) will be designated by the same reference numerals (or similar reference numerals), and redundant descriptions thereof will be omitted.

Hereinafter, the "network" may refer to a base station that communicates with user terminals or user equipment (UEs), and may be referred to as other terms, for example, a base station (BS), an access point (AP), a node B, and so on. Each network may provide communication coverage for a specific geographic area. In 3GPP, the term "cell" may refer to the coverage area of the network.

There may be a plurality of UEs in a cell, and each UE may be fixed or mobile. The UE may also be referred to as an access terminal, terminal, user terminal, communication equipment and/or the like. Herein, the "user equipment" and the "terminal" may be used interchangeably.

According to the 3GPP protocol 38214-g40, the resource selection and transmission in NR V2X sidelink mode 2 includes: (1) Determining candidate resource set A; (2) Evaluating resource set A to determine a final resource set B; (3) continuous Re-evaluation and Pre-emption; and (4) Transmitting traffic data using resources selected from resource set B.

The terminal may obtain the candidate resource set A (e.g., an indication of time/frequency resources available for use in sidelink communication) through a configuration or pre-configuration of the network, and/or may determine the candidate resource set A by autonomous sensing. When the candidate resource set A is determined by autonomous sensing, because the terminal may be unable to predict when a traffic data packet will arrive, the resource sensing is performed continuously, which may increase the power consumption of the terminal. In addition, because the candidate resource set determined by the autonomous sensing of each terminal may be different, and the resources selected according to the autonomous sensing may be dynamically scheduled (e.g., selected) and used by other terminals in the future, the resources for future transmission and retransmission of 32 slots selected according to the autonomous sensing may be occupied by other terminals, that is, a resource collision may occur, which results in failure (or reduced effectiveness) of resource selection and/or communication.

Then, the terminal performs RSRP measurement on all resources in the resource set A, and determines the final resource set B according to the sidelink (SL)-RSRP configured by the network and a final resource accounting X % configured by the terminal. The RSRP measurement process iterates several times and occupies excessive processing resources, which may result in greater power consumption.

Finally, after the resource selection of the terminal is completed, the resources that have been selected but not used may still be selected by other terminals, or may be dynamically scheduled and used by other terminal networks, resulting in resource collision. Therefore, the terminal continues the re-evaluation process and the pre-emption process.

The present disclosure provides an optimized or improved resource selection algorithm in sidelink mode 2. By planning the sidelink resources reasonably based on the user identifier (ID, represented by the source ID in SCI 2-A) and the number of current UEs, the probability of resource collision may be reduced, and the time to determine candidate resources, the probability of the re-evaluation process and the pre-emption process, and the power consumption of the terminal may likewise be reduced.

FIG. 1 is a flowchart illustrating a method for a UE to select resources autonomously according to some example embodiments.

Referring to FIG. 1, in operation S110, the UE may obtain, from a network, a sidelink resource set (e.g., an indication of time/frequency resources available for use in sidelink communication), a number of (e.g., an indication of the number of) UEs currently participating in sidelink transmission in current serving cell, and/or a first user identifier allocated by the network to the user equipment. Hereinafter, "the number of UEs currently participating in sidelink transmission in current serving cell" may be referred to simply as the "the number of current UEs".

In NR V2X mode 2, the parameters used for sidelink resource transmission may include: sl-NumSubchannel, sl-SubchannelSize, startSLsymbols, lengthSLsymbols, which are obtained from the configuration "RRCReconfiguration→SL-ConfigDedicatedNR→SL-FreqConfig→SL-BWP-Config IE" in 3GPP protocol 38331-g31, sent from the base station to the UE. In order to simplify the implementation of the UEs and to be consistent with the 3GPP protocol, in some example embodiments according to the present disclosure, the network may also use the above parameters to configure the sidelink resource set for the UEs. In order to reduce the message interaction between the network and the UEs, these parameters may be sent in the system information broadcast. Likewise, the number of current UEs may also be sent in the system information broadcast together. The assignment of the user ID may be consistent with the current 3GPP protocol specification, that is, may be obtained from RRCReconfiguration. However, the above parameters are only examples, and the parameters and/or data structures used by the network to transmit information for autonomous resource selection are not limited thereto.

The UE may obtain the sidelink resource set (or resource pool) which is configured or preconfigured, from the network, and the sidelink resource set for each user in the cell configured or preconfigured by the network may be the same or similar. In other words, when the network configures or pre-configures the sidelink resource set, it may avoid (or attempts to avoid) selecting resources from the dynamic scheduling resource pool configured or pre-configured to the terminal.

The network may allocate user IDs to all UEs in the current cell. In some example embodiments, the user ID may be an integer between 0 and 255, and may be represented by 8 bits. The user ID may be represented by the source ID in SCI 2-A. However, some example embodiments are not limited thereto, and the user ID may be a numerical value within another range.

The network may allocate user IDs to UEs participating in sidelink transmission in the current serving cell by, for example, assigning a user ID of an initial value (e.g., 0) of the ID range and assigning further user IDs in ascending order by incrementing the value of the previously assigned user ID. The user IDs in one cell may be different from each other (e.g., unique within the cell). In some example embodiments, when a certain UE exits the cell, its user ID may be released and re-enter the user ID allocation resource pool. In other words, the network may re-allocate the released user ID to a UE newly entering the cell (e.g., the user ID may be in continuous use). In some example embodiments, the network may allocate the minimum (e.g., lowest value) user ID, which is idle currently, to the UE newly entering the cell.

In addition, the network may broadcast the number of UEs participating in sidelink mode 2 resource allocation in the current serving cell to all UEs. Whenever the number of UEs is updated (for example, a UE exits the network or a new UE enters the network), the network may immediately (or promptly) broadcast the new number of UEs to all UEs in the current cell, and all the UEs may immediately (or promptly) re-allocate the sidelink resources.

In addition, when the sidelink resource pool changes, the network may also immediately (or promptly) broadcast a corresponding indication to all the UEs in the current serving cell, and all the UEs may immediately (or promptly) re-allocate sidelink resources.

In operation S120, the UE may divide resources in the sidelink resource set into a plurality of resource units according to a minimum (or smallest) resource allocation granularity, and assign sequence numbers to the plurality of resource units. Herein, the "resource unit" may be a basic unit of time-frequency resources divided according to the minimum (or smallest) resource allocation granularity.

In some example embodiments, the terminal may divide the time-frequency resources in the sidelink resource set according to both a minimum (or smallest) resource allocation granularity in the time domain and a minimum (or smallest) resource allocation granularity in the frequency domain. The minimum (or smallest) resource allocation granularity in the time domain may include a slot or Orthogonal Frequency Division Multiplexing (OFDM) symbol; and the minimum (or smallest) resource allocation granularity in the frequency domain may include one of a sub-channel, a resource block (RB), a physical resource block (PRB), and/or a resource block group (RBG).

In some example embodiments, the sequence numbers may be assigned sequentially (in ascending order) to the plurality of resource units divided in the minimum (or smallest) resource allocation granularity in the time domain, wherein the sequence numbers may be assigned in ascending order of the minimum (or smallest) resource allocation granularity in the frequency domain with respect to the resource units having the same minimum (or smallest) resource allocation granularity in the time domain. In other words, the sequence numbers may be assigned in ascending order in the frequency domain first, and then assigned in ascending order in the time domain.

Figure 2:
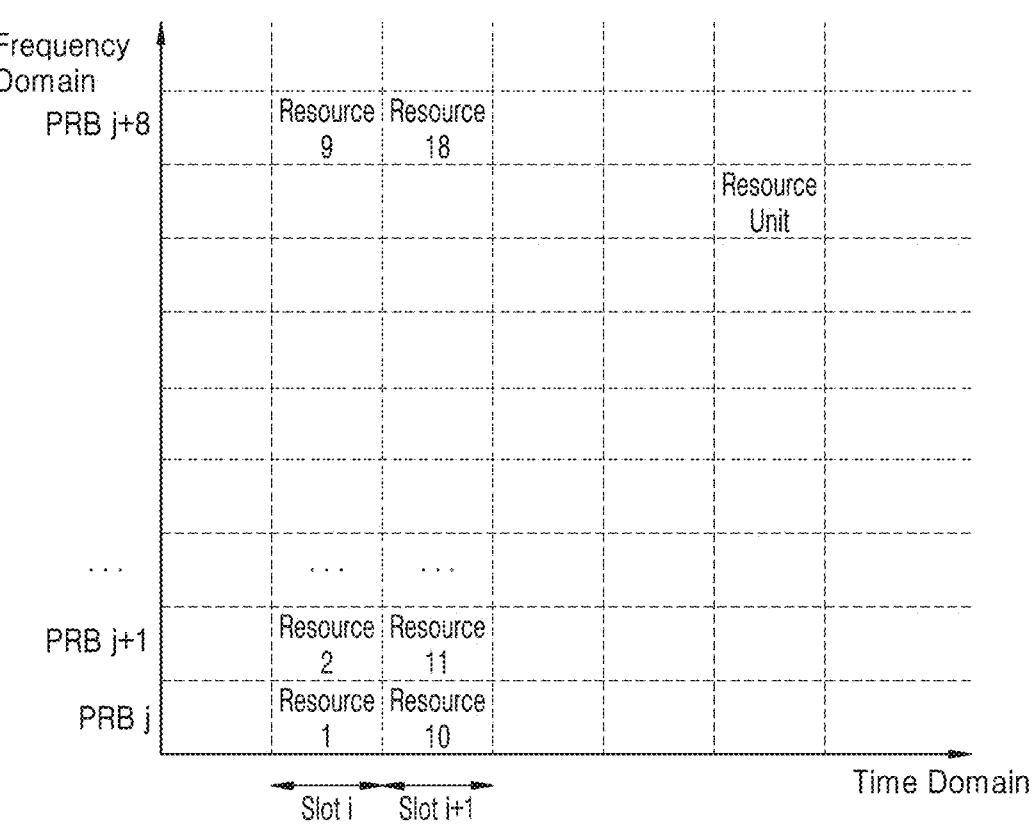
FIG. 2 is a diagram illustrating an example of dividing of resource units according to some example embodiments.

FIG. 2 is a diagram illustrating an example of dividing resource units according to some example embodiments. In FIG. 2, it is assumed that the minimum (or smallest) resource allocation granularity in the time domain is a slot, and the minimum (or smallest) resource allocation granularity in frequency domain is a PRB.

As shown in FIG. 2, the time-frequency resources of the sidelink resource set may be divided into a plurality of resource units according to both the minimum (or smallest) resource allocation granularity in the time domain and a minimum (or smallest) resource allocation granularity in the frequency domain. Thereafter, sequence numbers may be assigned sequentially to the plurality of resource units in ascending order of both the minimum (or smallest) resource allocation granularity in the time domain and the minimum (or smallest) resource allocation granularity in the frequency domain. Specifically, the sequence numbers may be assigned in ascending order of the minimum (or smallest) resource allocation granularity in the frequency domain with a higher priority, and the sequence numbers are assigned in ascending order of the minimum (or smallest) resource allocation granularity in the time domain with a lower priority. For example, the 9 resource units in slot i (corresponding to PRB j to PRB j+8, respectively) may be sorted in ascending order of the minimum (or smallest) resource allocation granularity in the frequency domain (e.g., PRB), and the sequence numbers 1~9 may be assigned. Thereafter, the 9 resource units in slot i+1 may be sorted in ascending order of PRB, and sequence numbers 10~18 may be assigned.

It should be understood that FIG. 2 only illustrates an example of dividing of time-frequency resources, and the inventive concepts are not limited thereto. In some example embodiments, the time domain resources and the frequency domain resources in the sidelink resource set obtained by the user equipment from the network may be discontinuous. For example, the network may allocate PRB 0 to PRB 20 in slot 1 and PRB 5 to PRB 15 in slot 3 to the UEs. In this case, when the above sidelink resource set allocated by the network is divided according to slot and PRB, there may be 21 resource units in slot 1, and 11 resource units in slot 3.

In some example embodiments, in order to ensure that the sequence numbers of the resource units in the sidelink resource set are the same for all the UEs, all the UEs in the network may divide resources in the sidelink resource set within a same time period (or contemporaneously), according to the same minimum (or smallest) resource allocation granularity and assign sequence numbers at same time (or contemporaneously).

Referring back to FIG. 1, in operation S130, the UE may select resource units having predetermined or alternatively, given sequence numbers from the sidelink resource set as sidelink resources of the UE, based on the number of UEs and the first user ID.

Through operation S130, each of the UEs in the cell may select respective sidelink resources based on the number of current UEs and a respective user ID.

The sidelink resources of the UE may include an initial transmission resource unit and retransmission resource units, and the retransmission resource units may include a first retransmission resource unit to an N-th retransmission resource unit, where N is a positive integer.

In some example embodiments, the selecting resource units having predetermined or alternatively, given sequence numbers from the sidelink resource set comprises determining a sequence number of the initial transmission resource unit, and sequence numbers of the retransmission resource units, based on the number of current UEs and the user ID of the UE (e.g., the first user ID), and selecting the initial transmission resource unit and the retransmission resource units having the determined sequence numbers from the sidelink resource set.

In some example embodiments, the sequence number of the initial transmission resource unit is obtained by performing a modulo operation on the first user ID and the number of the plurality of resource units (e.g., the first user ID mod the number of the plurality of resource units).

In some example embodiments, the sequence number of the N-th retransmission resource unit is a value obtained by adding a product of the number of current UEs and N to the sequence number of the initial transmission resource unit (e.g., (the number of current UEs*N)+the sequence number of the initial transmission resource unit).

For example, it's assumed that the number of UEs in the current cell is 4, with their IDs being 0~3 respectively, and the time-frequency resources in the network are divided into 32 resource units with sequence numbers 0~31. For a first user equipment (ID=0), the sequence number of the initial transmission resource unit is 0 (=0 mod(32)), and the sequence numbers of the first and N-th retransmission resource units are 4 (=0+4) and 4N (=0+4×N); for a second user equipment (ID=1), the sequence number of the initial transmission resource unit is 1, and the sequence numbers of the first and N-th retransmission resource units are 5 and 4N (1+4 xN).

The user equipment may flexibly select the above sidelink resources according to parameters such as the current transmission situation, the amount of data to be sent, the priority of the data packet, and the maximum (or highest) delay of the data packet. In some example embodiments, some of the resources may be unselected. For example, in the above example, the sequence numbers of the resource units allocated to the first user equipment (ID=0) may be (0, 4, 8, 12, 16, 20, 24, 28). A resource unit with a smaller sequence number indicates an earlier position in the time domain, whereas a resource unit with a larger sequence number indicates a later position in the time domain. When the UE allocates sidelink resources for the data to be transmitted, the data with a small delay budget and high priority is preferentially allocated to the sidelink resources with a smaller sequence number, and the allocation of the sidelink resources is based on the ascending order of resource units, until all the sidelink resources are allocated. If the data to be transmitted by the UE has not been sent completely at this time, the UE needs to wait until the next cycle to select and allocate resource units for transmitting; if all the data to be transmitted by the UE has been transmitted and there is no subsequent data to be transmitted, the UE may report to the base station that there is no sidelink resource allocation requirements. The base station evaluates according to the current sidelink resource pool and the number of current UEs, so as to determine whether to reclaim the user ID. For example, in the case that the current sidelink resource pool is small (e.g., less than a predetermined threshold), or the number of UEs currently participating in sidelink resource transmission is large (e.g., more than a predetermined threshold), the base station may promptly reclaim the IDs of the UEs having no sidelink transmission requirements.

In operation S140, the UE may transmit data of the UE using the sidelink resources thereof. According to some example embodiments, operation S140 may include transmitting, by the UE, a communication signal to another device (e.g., the network, another UE, etc.) using the sidelink resources of the UE. According to some example embodiments, the communication signal may be a sidelink communication signal.

In some example embodiments, all the UEs may repeat the processes of operations S110 to S140 every predetermined or alternatively, given period. For example, slot 0 of SFN0 (system frame number 0) may be used as the base point, and the UEs may obtain the sidelink resource set, the number of current UEs, and the respective user ID allocated by the network, from the network every 32 slots, and then divide the time-frequency resources in the resource set according to the same minimum (or smallest) resource allocation granularity, assign sequence numbers to the divided resource units according to the same ascending ordering rule, and select respective resources based on the respective user ID and the number of current UEs.

In some example embodiments, each time the number of UEs in the cell changes, all the UEs in the cell may re-execute the processes of operations S110 to S140.

In some example embodiments, each time the sidelink resource pool in the cell changes, all the UEs in the cell may re-execute the processes of operations S110 to S140.

According to the foregoing resource allocation principles, the resources of multiple UEs in the cell will not overlap (or the occurrence and/or extent of overlap will be reduced). Accordingly, each UE may use its own resources only, and not the resources of other UEs, to transmit traffic data. Therefore, the probability of resource conflicting may be reduced, and the power consumption of the UE may be reduced.

Figure 3:
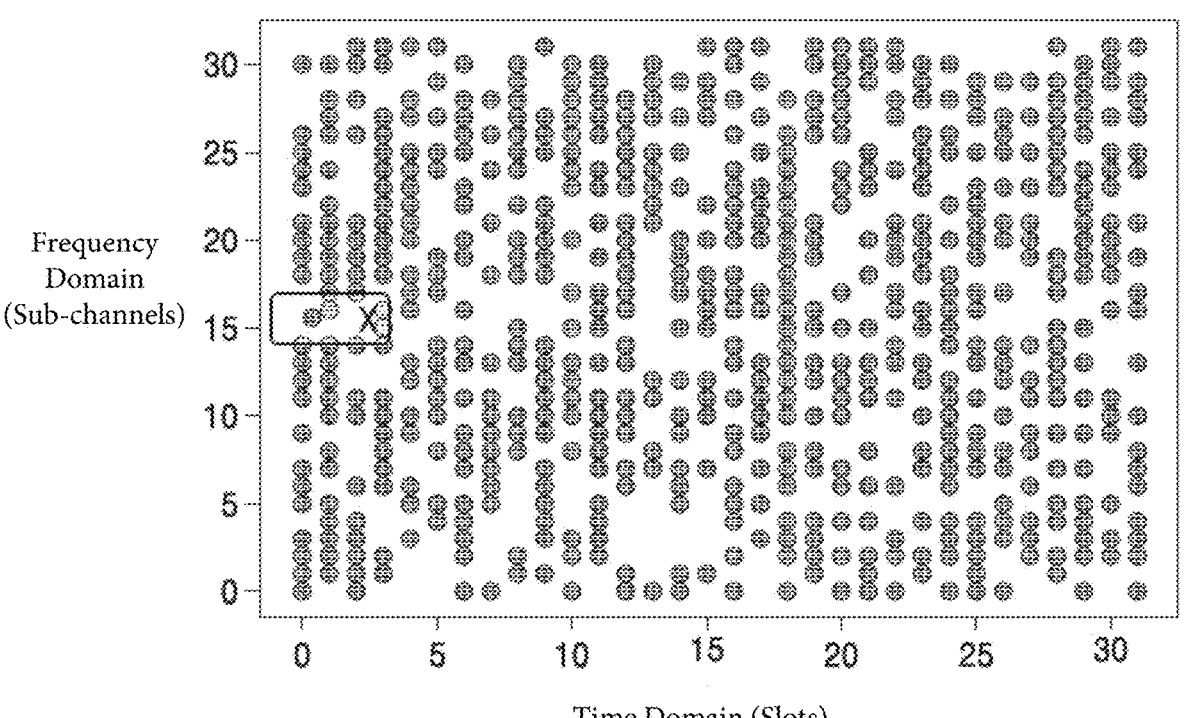
FIGS. 3 and 4 illustrate simulation results according to conventional resource selection methods.
Figure 4:
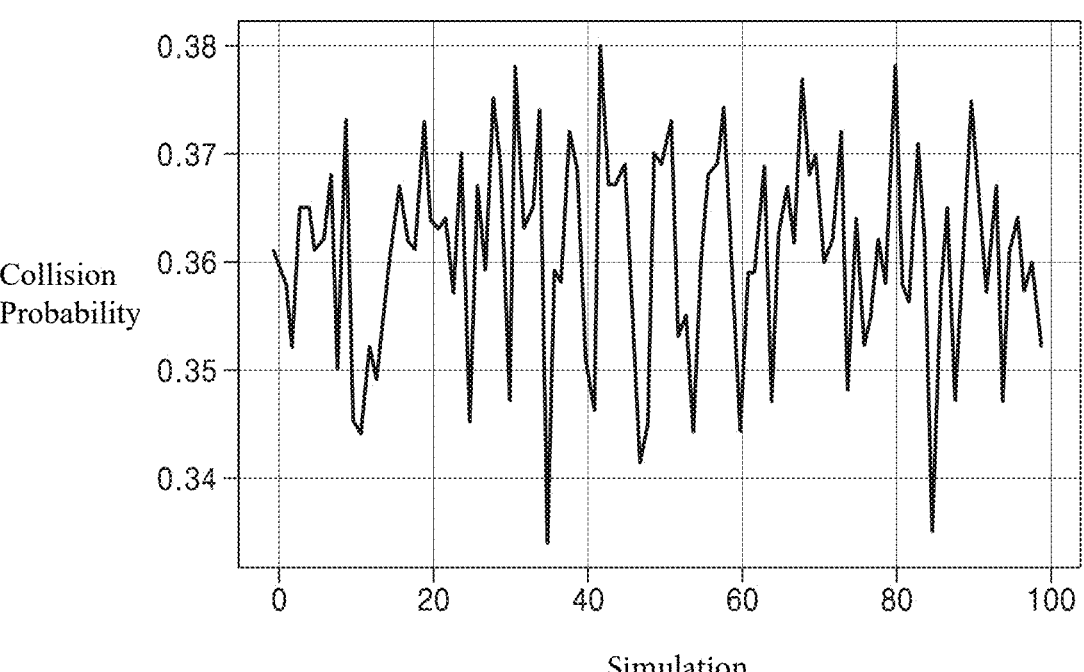

FIGS. 3 and 4 illustrate simulation results of the UEs selecting resources autonomously according to a comparative example.

In FIGS. 3 and 4, the following simulation conditions are assumed: the resources in the sidelink resource set are divided into 1024 resource units according to the rule that the minimum (or smallest) resource allocation granularity in the time domain is a slot and the minimum (or smallest) resource allocation granularity in the frequency domain is a sub-channel, that is, there are 32 slots in the time domain, and there are 32 sub-channels for each slot; there are 250 UEs which participate in sidelink transmission resource selection in the current cell, and their user IDs are integers that increase sequentially from 0 to 249; and each UE selects 4 resource units as sidelink resources thereof.

Because the 250 UE's selection of resources in the time domain and frequency domain is performed randomly, and each of the UEs performs resource selection independently, the effect of such resource selection may be considered as corresponding to 1000 random resource selection operations in the time domain and frequency domain.

FIG. 3 illustrates a distribution diagram of resource units selected by UEs in one simulation. In FIG. 3, filled circles (indicated by "x" in FIG. 3) represent the resource unit selected by the UE. Because the resource set is not planned, each UE independently selects resources, resulting in great resource collisions and resource waste (for example, as indicated by the blank area in FIG. 3). According to the simulation results, in the case of random time-frequency resource selection in FIG. 3, the probability of resource collision is 37.80%.

In order to obtain more accurate simulation results statistically, the above simulation process is repeated 100 times. FIG. 4 illustrates a diagram of the probability of resource collision during the 100 simulations, wherein the average value of the probability of resource collision is 36.06%.

Figure 5:
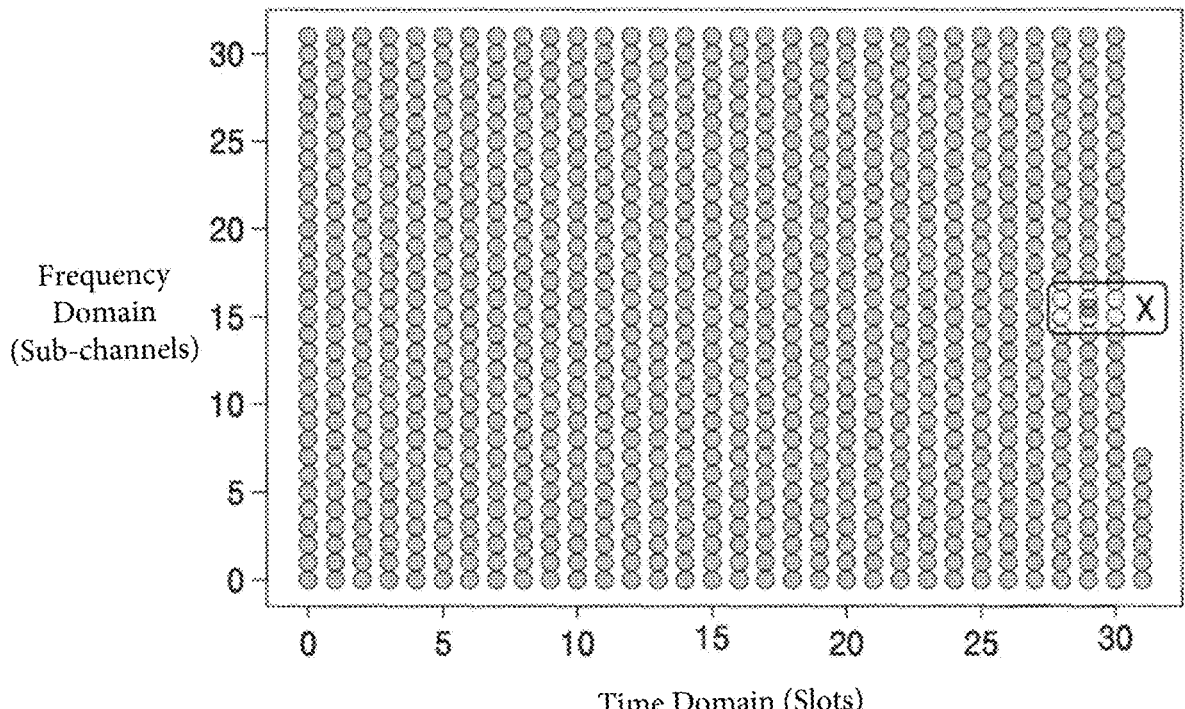
FIG. 5 illustrates illustrate a simulation result of a method for UEs to select resources autonomously according to some example embodiments.

FIG. 5 illustrates illustrate simulation result of a method for the user equipment to select resources autonomously according to some example embodiments.

The simulation conditions in FIG. 5 are exactly the same as (or similar to) those in FIGS. 3 and 4, except that the user equipment selects the sidelink resource based on the user ID and the number of current user equipments, and the description will not be repeated herein.

FIG. 5 illustrates a distribution diagram of resource units selected by UEs in one simulation. According to the simulation result, in the case that the UE according to some example embodiments in FIG. 5 selects resources autonomously, the resource utilization is improve, resource waste is reduced, and the probability of resource collision is 0 (or approximately 0).

Through the above simulation results, the optimized (or improved) resource selection algorithm according to some example embodiments of the present disclosure may plan (or schedule) sidelink resources reasonably based on the user ID and the number of current UEs, thereby the probability of resource collision may be reduced significantly, and the time to determine candidate resources, the probability of the re-evaluation process and the pre-emption process, and the power consumption of the terminal may likewise be reduced.

Figure 6:
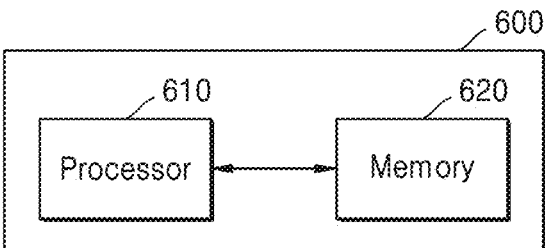
FIG. 6 illustrates a block diagram of a communication equipment according to some example embodiments.
Figure 7:
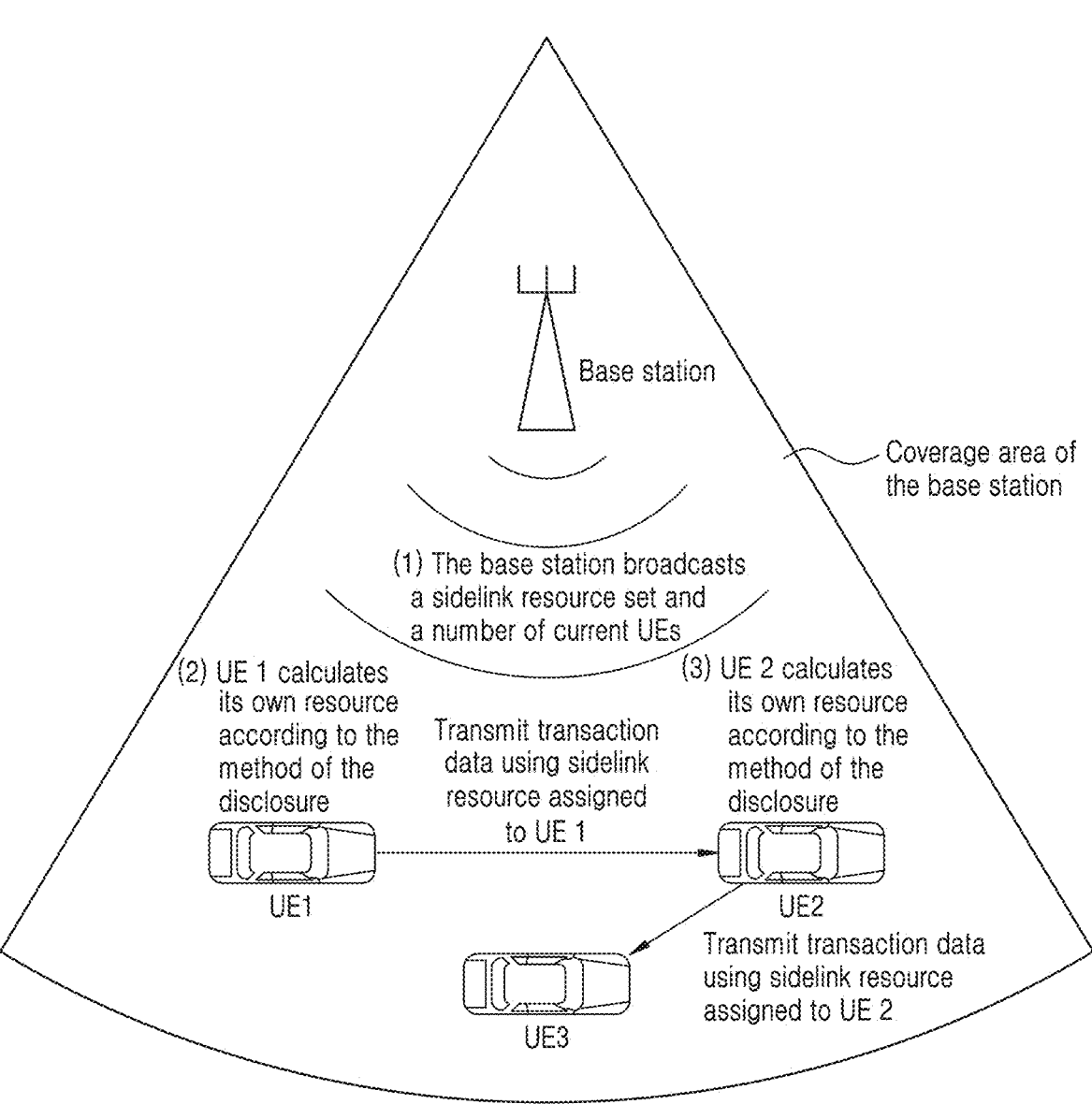
FIG. 7 illustrates a system in which the communication equipment of FIG. 6 operates.

FIG. 6 illustrates a block diagram of a communication equipment according to some example embodiments, and FIG. 7 illustrates a system in which the communication equipment of FIG. 6 operates.

As shown in FIG. 6, a UE (e.g., a communication equipment) 600 according to some example embodiments includes a processor 610 and a memory 620.

The processor 610 may control the overall operation of the communication equipment, and may control part or all of the internal elements of the communication equipment. The processor 610 may be implemented as a wireless communication baseband processor, a communication processor CP, a general-purpose processor, an application processor (AP), an application specific integrated circuit, a field programmable gate array, etc., but some example embodiments are not limited thereto. The processor 610 may be configured to implement the method for the user equipment to select resources autonomously disclosed herein.

The memory 620 may include volatile memory and/or non-volatile memory. The memory 620 may store various data generated and used by the communication equipment. For example, the memory 620 may store an operating system and/or an application program (for example, an application program associated with the method of the inventive concepts) used to control the operation of the communication equipment.

FIG. 7 illustrates three UEs 600 (e.g., UE 1, UE 2, and UE 3) within the coverage area of the base station (i.e., within the serving cell), but this is only an example, and the number of UEs in the serving cell is not limited thereto.

Referring to FIG. 7, UE 1 and UE 2 participate in sidelink transmission, while UE 3 does not participate in sidelink transmission. The base station first broadcasts the transmit sidelink resource set and the number of current UEs (e.g., 2). Then each UE (e.g., UE 1 and UE 2) participating in the sidelink transmission in the serving cell selects its own sidelink resources according to the method for autonomous resource selection of the present disclosure, and sends business data using respective sidelink resource.

Conventional devices for autonomous resource selection select resources for communication in an unscheduled manner. For example, a conventional device performs resource sensing to determine a resource set for use in communication (e.g., sidelink communication). However, other conventional devices in a cell with the conventional device dynamically select resources from the resource set determined by the conventional device. Accordingly, as the number of conventional devices in the cell increases the probability of resource collision increases. In an attempt to limit the probability of resource collision, the conventional device performs the resource sensing continuously resulting in excessive resource consumption (e.g., processor, power, memory, bandwidth, delay, etc.).

According to some example embodiments, however, improved devices (e.g., UEs) are provided for autonomous resource selection. For example, each respective improved device may select (e.g., schedule) a resource set for use in communication (e.g., sidelink communication) based on a corresponding user ID and a number of devices in a cell, and/or according to a selection procedure used by all the devices in the cell. Accordingly, the improved devices prevent or reduce resource collision among devices in the cell without continuously performing resource sensing. Thus, the improved devices overcome the deficiencies of the conventional devices to at least reduce resource consumption (e.g., processor, power, memory, bandwidth, delay, etc.).

According to some example embodiments, operations described herein as being performed by the UE 600, the processor 610 and/or the network may be performed by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The apparatuses, units, modules, devices, and other components described herein may be implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and/or any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller, an arithmetic logic unit, a digital signal processor, a microcomputer, a programmable logic controller, a field-programmable gate array, a programmable logic array, a microprocessor, and/or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and/or store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and/or multiple-instruction multiple-data (MIMD) multiprocessing.

The methods that perform the operations described in this application may be performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above may be written as computer programs, code segments, instructions or any combination thereof, for individually or collectively instructing or configuring the processor or computer to operate as a machine or special-purpose computer to perform the operations of the hardware components and the methods as described above. In one example, the instructions and/or software include machine code that is directly executed by the processor or computer, such as machine code produced by a compiler. In another example, the instructions or software include higher-level code that is executed by the processor or computer using an interpreter. Persons and/or programmers of ordinary skill in the art may readily write the instructions and/or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, may be recorded, stored, or fixed in or on one or more non-transitory computer-readable storage media. Examples of a non-transitory computer-readable storage medium include at least one of read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card or a micro card (for example, secure digital (SD) or extreme digital (XD)), magnetic tapes, floppy disks, magneto-optical data storage devices, optical data storage devices, hard disks, solid-state disks, and/or any other device that is configured to store the instructions or software and any associated data, data files, and/or data structures in a non-transitory manner and providing the instructions or software and any associated data, data files, and/or data structures to a processor or computer so that the processor or computer may execute the instructions.

While some example embodiments have been described, it will be apparent to one of ordinary skill in the art that various changes in form and details may be made without departing from the spirit and scope of the claims and their equivalents.

What is claimed is:

1. A method for autonomous resource selection by a user equipment (UE), the method comprising:

obtaining a sidelink resource set, a number of current UEs and a first user identifier (ID) from a network, the number of current UEs corresponding to UEs currently participating in sidelink transmission in a serving cell;

assigning a plurality of sequence numbers to a plurality of resource units among the sidelink resource set;

selecting a subset of the plurality of resource units as sidelink resources of the UE, the subset of the plurality of resource units having particular sequence numbers from among the plurality of sequence numbers, and the selecting including, computing a first sequence number among the particular sequence numbers by performing a modulo operation based on the first user ID and a number of the plurality of resource units, and computing a second sequence number among the particular sequence numbers by adding the first sequence number to the number of current UEs; and transmitting a communication signal using the sidelink resources of the UE.

2. The method of claim 1, further comprising:

dividing the sidelink resource set according to both a minimum resource allocation granularity in a time domain and a minimum resource allocation granularity in a frequency domain to obtain the plurality of resource units,

15

16 wherein the assigning the plurality of sequence numbers comprises assigning the plurality of sequence numbers to the plurality of resource units sequentially in ascending order with respect to the time domain prior to the frequency domain.

3. The method of claim 2, wherein the minimum resource allocation granularity in the time domain includes a slot or an orthogonal frequency division multiplexing symbol; and the minimum resource allocation granularity in the frequency domain includes one of a sub-channel, a resource block, a physical resource block or a resource block group.

4. The method of claim 1, wherein the sidelink resources of the UE include an initial transmission resource unit and retransmission resource units, the retransmission resource units including first to Nth retransmission resource units, N being a positive integer; and the selecting the subset of the plurality of resource units comprises, selecting the initial transmission resource unit based on the first sequence number, selecting the first retransmission resource units based on the second sequence number, and selecting the Nth retransmission resource unit based on a third sequence number among the particular sequence numbers, the third sequence number being obtained by adding the first sequence number to a product of the number of current UEs and N.

5. The method of claim 1, further comprising:

repeating the obtaining the sidelink resource set based on a time period or a change in the number of current UEs.

6. The method of claim 5, wherein the time period is 32 slots.

7. The method of claim 1, wherein the first user ID is allocated to the UE by the network, the first user ID is an integer between 0 and 255, and the first user ID is unique within the serving cell; and the method further comprises, releasing, by the UE, the first user ID when the UE exits the serving cell, and re-allocating, by the network, the first user ID to another UE entering the serving cell based on the first user ID having a lowest value among available user IDs.

8. The method of claim 1, wherein all UEs in the serving cell perform the assigning at the same time and according to the same minimum resource allocation granularity such that the plurality of sequence numbers assigned to the plurality of resource units are the same for all the UEs.

9. A user equipment (UE) comprising:

processing circuitry configured to, obtain a sidelink resource set, a number of current UEs and a first user identifier (ID) from a network, the number of current UEs corresponding to UEs currently participating in sidelink transmission in a serving cell, assign a plurality of sequence numbers to a plurality of resource units among the sidelink resource set, select a subset of the plurality of resource units as sidelink resources of the UE, the subset of the plurality of resource units having particular sequence numbers from among the plurality of sequence numbers, and the selection including, computing a first sequence number among the particular sequence numbers by performing a modulo operation based on the first user ID and a number of the plurality of resource units, and computing a second sequence number among the particular sequence numbers by adding the first sequence number to the number of current UEs, and transmit a communication signal using the sidelink resources of the UE.

10. The UE of claim 9, wherein the processing circuitry is configured to:

divide the sidelink resource set according to both a minimum resource allocation granularity in a time domain and a minimum resource allocation granularity in a frequency domain to obtain the plurality of resource units; and assign the plurality of sequence numbers to the plurality of resource units sequentially in ascending order with respect to the time domain prior to the frequency domain.

11. The UE of claim 10, wherein the minimum resource allocation granularity in the time domain includes a slot or an orthogonal frequency division multiplexing symbol; and the minimum resource allocation granularity in the frequency domain includes one of a sub-channel, a resource block, a physical resource block or a resource block group.

12. The UE of claim 9, wherein the sidelink resources of the UE include an initial transmission resource unit and retransmission resource units, the retransmission resource units including first to Nth retransmission resource units, N being a positive integer; and the processing circuitry is configured to select the subset of the plurality of resource units by, selecting the initial transmission resource unit based on the first sequence number, selecting the first retransmission resource units based on the second sequence number, and selecting the Nth retransmission resource unit based on a third sequence number among the particular sequence numbers, the third sequence number being obtained by adding the first sequence number to a product of the number of current UEs and N.

13. The UE of claim 9, wherein the processing circuitry is configured to:

re-obtain the sidelink resource set from the network based on a time period or a change in the number of current UEs.

14. The UE of claim 13, wherein the time period is 32 slots.

15. A non-transitory computer-readable storage medium storing instructions that, when executed by at least one processor of a user equipment (UE), cause the at least one processor to:

obtain a sidelink resource set, a number of current UEs and a first user identifier (ID) from a network, the number of current UEs corresponding to UEs currently participating in sidelink transmission in a serving cell;

assign a plurality of sequence numbers to a plurality of resource units among the sidelink resource set;

select a subset of the plurality of resource units as sidelink resources of the UE, the subset of the plurality of resource units having particular sequence numbers from among the plurality of sequence numbers, and the selection including, computing a first sequence number among the particular sequence numbers by performing a modulo operation based on the first user ID and a number of the plurality of resource units, and computing a second sequence number among the particular sequence numbers by adding the first sequence number to the number of current UEs; and transmit a communication signal using the sidelink resources of the UE.

16. The non-transitory computer-readable storage medium of claim 15, wherein the instructions cause the at least one processor to:

divide the sidelink resource set according to both a minimum resource allocation granularity in a time domain and a minimum resource allocation granularity in a frequency domain to obtain the plurality of resource units; and assign the plurality of sequence numbers to the plurality of resource units sequentially in ascending order with respect to the time domain prior to the frequency domain.

17. The non-transitory computer-readable storage medium of claim 16, wherein the minimum resource allocation granularity in the time domain includes a slot or an orthogonal frequency division multiplexing symbol; and the minimum resource allocation granularity in the frequency domain includes one of a sub-channel, a resource block, a physical resource block or a resource block group.

18. The non-transitory computer-readable storage medium of claim 15, wherein the sidelink resources of the UE include an initial transmission resource unit and retransmission resource units, the retransmission resource units including first to Nth retransmission resource units, N being a positive integer; and the instructions cause the at least one processor to select the subset of the plurality of resource units by, selecting the initial transmission resource unit based on the first sequence number, selecting the first retransmission resource units based on the second sequence number, and selecting the Nth retransmission resource unit based on a third sequence number among the particular sequence numbers, the third sequence number being obtained by adding the first sequence number to a product of the number of current UEs and N.

19. The non-transitory computer-readable storage medium of claim 15, wherein the instructions cause the at least one processor to:

re-obtain the sidelink resource set from the network based on a time period or a change in the number of current UEs.

20. The non-transitory computer-readable storage medium of claim 19, wherein the time period is 32 slots.

* * * * *